(12) United States Patent
Ran et al.

(10) Patent No.: US 8,983,207 B1
(45) Date of Patent: Mar. 17, 2015

(54) MITIGATING REPLAY ATTACKS USING MULTIPLE-IMAGE AUTHENTICATION

(71) Applicant: Intuit Inc., Mountain View, CA (US)

(72) Inventors: Alexander S. Ran, Palo Alto, CA (US); Christopher Z. Lesner, Palo Alto, CA (US); Cynthia J. Osmon, Mountain View, CA (US)

(73) Assignee: Intuit Inc., Mountain View, CA (US)

( * ) Notice: Subject to any disclaimer, the term of this patent is extended or adjusted under 35 U.S.C. 154(b) by 254 days.

(21) Appl. No.: 13/738,156

(22) Filed: Jan. 10, 2013

(51) Int. Cl.
*G06K 9/62* (2006.01)
*G06K 9/00* (2006.01)
*G10L 15/00* (2013.01)
*G10L 17/00* (2013.01)

(52) U.S. Cl.
CPC ............ *G06K 9/00221* (2013.01); *G10L 17/00* (2013.01)
USPC ............ 382/209; 382/181; 704/246; 704/273

(58) Field of Classification Search
CPC .................................................. G06K 9/00221

USPC ........... 382/155–231; 704/231–257, 270–275
See application file for complete search history.

(56) References Cited

U.S. PATENT DOCUMENTS

| | | | |
|---|---|---|---|
| 8,423,785 B2* | 4/2013 | Takikawa et al. | 713/186 |
| 2008/0170123 A1* | 7/2008 | Albertson et al. | 348/157 |
| 2013/0239206 A1* | 9/2013 | Draluk et al. | 726/19 |

\* cited by examiner

*Primary Examiner* — Jesse Pullias
(74) *Attorney, Agent, or Firm* — Park, Vaughan, Fleming & Dowler LLP; Steven E. Stupp

(57) ABSTRACT

A technique for authenticating a user is described. During this authentication technique, an electronic device (such as a cellular telephone) captures multiple images of the user while the user moves the electronic device in a pre-defined manner (for example, along a path in 3-dimensional space), and determines positions of the electronic device when the multiple images were captured. Then, the electronic device compares the images at the positions with corresponding pre-existing images of the user captured at different points of view. If the comparisons achieve a match condition, the electronic device authenticates the user. In this way, the authentication technique may be used to prevent successful replay attacks.

20 Claims, 3 Drawing Sheets

MITIGATING REPLAY ATTACKS USING MULTIPLE-IMAGE AUTHENTICATION

BACKGROUND

The present disclosure relates to a technique for mitigating replay attacks during authentication processes. More specifically, the present disclosure relates to a technique for preventing replay attacks during an authentication process by using multiple images that are captured while an image sensor is moving.

Authentication techniques are used in many electronic devices to ensure that individuals attempting to access or use the electronic devices are who they claim to be. One increasingly popular authentication technique is based on face recognition. For example, leveraging the imaging sensors in many electronic devices, such as cellular telephones and laptop computers, an image of an individual can be acquired and compared to a pre-existing image. If there is a match, the individual is authenticated.

However, this face-recognition-based authentication technique is susceptible to a replay attack. In particular, if an attacker has a static image or a video of the individual, they can be authenticated by an electronic device by simply presenting this image or video to the imaging sensor in the electronic device. This security risk can undermine users' confidence in using their electronic devices, for example, to conduct financial or sensitive transactions.

SUMMARY

The disclosed embodiments relate to a technique for authenticating a user, which may be performed by an electronic device. During operation, the electronic device provides an authentication instruction (for example, to the user) to move the electronic device in a pre-defined manner. Then, using an imaging sensor, the electronic device captures multiple images of the user while the user moves the electronic device in the pre-defined manner. Moreover, using a displacement sensor, the electronic device determines positions of the electronic device when the multiple images were captured. Next, the electronic device compares the images at the positions with corresponding pre-existing images of the user captured at different points of view. If the comparisons achieve a match condition, the electronic device authenticates the user.

Note that the pre-defined manner may include a path at least partially around a head of the user.

Moreover, the displacement sensor may include: an accelerometer, a gyroscope, and/or a second imaging sensor on an opposite side of the electronic device from the imaging sensor.

Furthermore, the points of view may be associated with different angles and distances from the user.

Additionally, the authentication instruction may include asking the user to speak during the authentication. In this embodiment, the electronic device may capture a voice of the user using an audio sensor, and may compare the sound of the voice of the user with a pre-existing audio file of the voice of the user. Note that the authentication may be based on achieving a second match condition between the sound of the voice of the user and the pre-existing audio file. In these embodiments, the facial expression(s) captured at the time of utterance may correspond to the facial expression(s) that correspond to the utterance on the enrolled images.

In some embodiments, the authentication is based on a challenge-response test. This challenge-response test may involve specific motion or utterance performed by the user while moving the device to capture images for authentication.

Moreover, comparing the images may involve extracting features from the images, and the match condition may be based on the extracted features and features in the pre-existing images.

In some embodiments, after authenticating the user, the electronic device unlocks itself.

Another embodiment provides a method that includes at least some of the operations performed by the electronic device.

Another embodiment provides a computer-program product for use with the electronic device. This computer-program product includes instructions for at least some of the operations performed by the electronic device.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an electronic device, a technique for authenticating a user, and a computer-program product (e.g., software) for use with the electronic device are described. During this authentication technique, the electronic device captures multiple images of the user while the user moves the electronic device in a pre-defined manner (for example, along a path in 3-dimensional space), and determines positions of the electronic device when the multiple images were captured. Then, the electronic device compares the images at the positions with corresponding pre-existing images of the user captured at different points of view. If the comparisons achieve a match condition, the electronic device authenticates the user.

By authenticating the user based on multiple images captured at different positions (and, thus, different points of view), the authentication technique can reduce the likelihood of a replay attack. Therefore, the authentication technique may increase the security of the electronic device while maintaining ease of use for the user, which may increase the confidence of the user when using the electronic device, and may improve the satisfaction of the user and their overall user experience. As a consequence, the authentication technique may increase sales of the electronic device, as well as customer retention.

In the discussion that follows, a user may include: an individual (for example, an existing customer, a new customer, a service provider, a vendor, a contractor, etc.), an organization, a business and/or a government agency. Furthermore, a 'business' should be understood to include: for-profit corporations, non-profit corporations, organizations, groups of individuals, sole proprietorships, government agencies, partnerships, etc.

Figure 1:
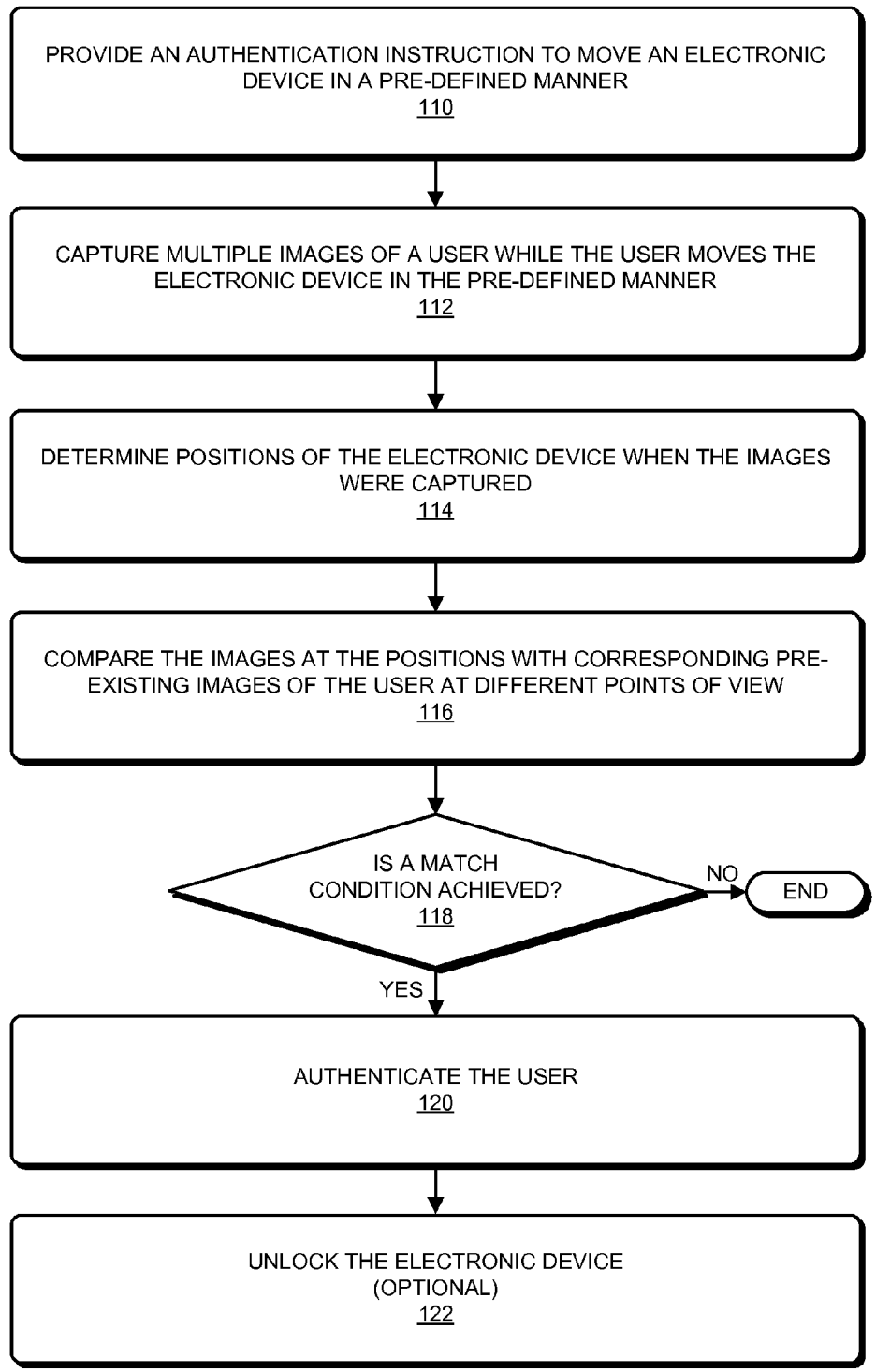
FIG. 1 is a flow chart illustrating a method for authenticating a user in accordance with an embodiment of the present disclosure.
Figure 2:
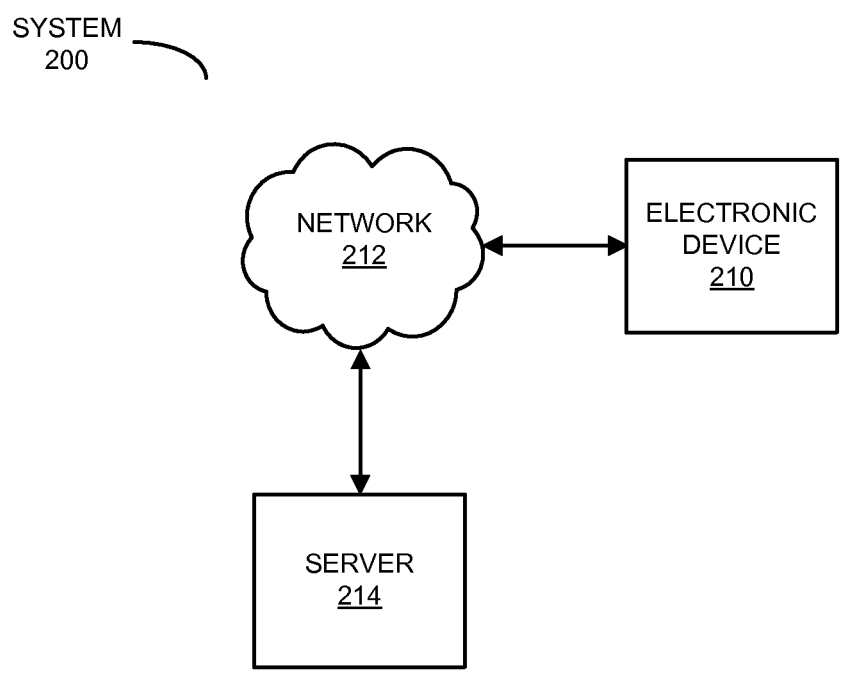
FIG. 2 is a block diagram illustrating a system that performs the method of FIG. 1 in accordance with an embodiment of the present disclosure.

We now describe embodiments of the authentication technique. FIG. 1 presents a flow chart illustrating a method 100 for authenticating a user, which may be performed by an electronic device, such as electronic device 200 (FIG. 2). During operation, the electronic device provides an authentication instruction to move the electronic device in a pre-defined manner (operation 110). For example, the pre-defined manner may include a path at least partially around a head of the user. More generally, the path may be in 3-dimensional space, such as an arc.

Then, using an imaging sensor, the electronic device captures multiple images of the user while the user moves the electronic device in the pre-defined manner (operation 112). For example, the imaging sensor may include a CMOS imaging sensor, a charge-coupled device or a camera.

Moreover, using at least a displacement sensor, the electronic device determines positions of the electronic device when the multiple images were captured (operation 114). For example, the displacement sensor may include: an accelerometer, a gyroscope, a local positioning sensor, a global positioning sensor, a triangulation sensor, and/or a second imaging sensor on an opposite side of the electronic device from the imaging sensor. Thus, the displacement sensor may include information provided by sensors and/or systems that are external to the electronic device. In some embodiments, acceleration measurements made using an accelerometer are double integrated to determine displacement of the electronic device.

Next, the electronic device compares the images at the positions with corresponding pre-existing images of the user captured at different points of view (operation 116) (i.e., the pre-existing images are at different points of view from each other). For example, comparing the images may involve extracting features from the images. Note that the points of view may be associated with different angles and distances from the user.

If the comparisons achieve a match condition (operation 118), the electronic device authenticates the user (operation 120). For example, the match condition may be based on extracted features from the images and features in the pre-existing images. Otherwise (i.e., if the match condition is not achieved), method 100 ends. Note that when the match condition is achieved, the electronic device may emit an audible tone or an audio cue. More generally, the electronic device may provide sensory feedback to the user.

Additionally, the authentication instruction may include asking the user to speak during the authentication. In this embodiment, the electronic device may capture a voice of the user using an audio sensor, and may compare the sound of the voice of the user with a pre-existing audio file of the voice of the user. Note that the authentication may be based on achieving a second match condition between the sound of the voice of the user and the pre-existing audio file. In these embodiments, the facial expression(s) captured at the time of utterance may correspond to the facial expression(s) that correspond to the utterance on the enrolled images.

In some embodiments, the authentication is based on a challenge-response test. This challenge-response test may involve specific motion or utterance performed by the user while moving the device to capture images for authentication. For example, the electronic device may request that the user turn their head to the right or left when the images are captured (operation 112).

Furthermore, after authenticating the user, the electronic device may optionally unlock itself (operation 122).

While the preceding discussion illustrated authentication, in some embodiments similar operations may be performed by the electronic device when the user is enrolled, i.e., when the pre-existing images are first captured. In particular, during enrollment, the user may be instructed to move the electronic device in the pre-defined manner. Then, while the user is moving the electronic device, multiple images may be captured and associated positions of the electronic device when the images were captured may be determined. The images and the positions may be stored in a computer-readable memory for subsequent use when authenticating the user.

In this way, the authentication technique may provide seamless and secure authentication on the electronic device, which may facilitate secure services, such as the ability to conduct a financial transaction using the electronic device.

In some embodiments of method 100, there may be additional or fewer operations. Moreover, the order of the operations may be changed, and/or two or more operations may be combined into a single operation.

In the discussion that follows, a cellular telephone is used as an illustrative example of the electronic device. However, in other embodiments, a wide variety of electronic devices can be used.

When a user attempts to access or open the cellular telephone, an authentication module executing on the cellular telephone may perform the operations in the authentication technique. Both enrollment and authentication may be accomplished while the electronic device is moving on a dynamic trajectory around the head of the user, and thus while the imaging sensor is capturing the multiple images (such as video) of the user and the displacement sensor determines positions of the electronic device. For example, this may be accomplished by the user holding the cellular telephone in their hand while slowly moving the extended arm from one side of their body to the other or following another trajectory as instructed.

Using the displacement sensor (for example, one or more accelerometers, a gyroscope, the second imaging sensor, etc.) while capturing the multiple images ensures that the imaging sensor is looking at a 3-dimensional object (i.e., the user), and makes it possible to reliably estimate the size of this object in addition to matching features from the images with those extracted from pre-existing images of enrolled individuals as the appropriate points of view (such as view angles and distances).

Note that the comparison of the images and the pre-existing images to determine if the match condition has been achieved (i.e., the recognition) may be performed using a variety of techniques known in the art. For example, every face has numerous, distinguishable features or landmarks, i.e., the different peaks and valleys that make up facial features. In particular, each human face has approximately 80 such nodal points, including: the distance between the eyes, the width of the nose, the depth of the eye sockets, the shape of the cheekbones, the length of the jawline, etc. These nodal points can be measured to specify a numerical code (called a faceprint), and can be used to represent the face in a data structure. Selection of the stable facial features that can be combined to generate the faceprint may involve maximizing the recognition and minimizing the false positive rate. This can performed using standard feature-selection or supervised-learning techniques, such as: discriminant analysis, factor analysis, principal component analysis, etc.

By correlating the real-time position (i.e., the point of view) of the imaging sensor (determined from the displacement sensor or sensors) with the view of the user's head expected from that point of view, the authentication technique is less sensitive to replay attacks because it is very difficult for an attacker to know the pre-defined manner in which the cellular telephone should be moved (i.e., it is very difficult to achieve the needed close correlation between two independent information streams).

In some embodiments, for an extra layer of security, a challenge-response test may be used to strengthen the authentication. For example, the user may be instructed to speak out loud to capture features from their moving facial expressions in addition to the sound of their voice.

In an exemplary embodiment, a user, John, enrolls himself by holding his cellular telephone in his hand with the imaging sensor or camera pointed at his face, and slowly moves it around as prompted. Using the captured images or video and the displacement-sensor data, the cellular telephone extracts features necessary to recognize John's face from the multiple viewpoints available from the motion trajectory. After enrollment, in order to authenticate himself to the locked cellular telephone, John similarly moves his cellular telephone as prompted until a positive match is confirmed.

Note that, in addition to facial expression authentication, John may be asked to speak while he is moving the cellular telephone so that the sound of his voice and facial expressions can be recorded and matched as well. Moreover, additional security may be obtained by logging and auditing authentication attempts.

In some embodiments, the authentication technique is able to tolerate change, such as lack of shaving. For example, after successful authentication, the authentication technique may allow for slow drift in the facial features to track hair growth and may revert rapidly to previous features, such as after a haircut.

We now describe embodiments of a system and the electronic device, and its use. FIG. 2 presents a block diagram illustrating a system 200 that can be used, in part, to perform operations in method 100 (FIG. 1). In this system, during the authentication technique users of electronic device 210 may use a software product, such as a software application that is resident on and that executes on electronic device 210. (Alternatively, the user may interact with a web page that is provided by server 214 via network 212, and which is rendered by a web browser on electronic device 210. For example, at least a portion of the software application may be an application tool that is embedded in the web page, and which executes in a virtual environment of the web browser. Thus, the application tool may be provided to the user via a client-server architecture.) This software application may be a standalone application or a portion of another application that is resident on and which executes on electronic device 210 (such as a software application that is provided by server 214 or that is installed and which executes on electronic device 210).

During the authentication technique, a user of electronic device 210 receives the authentication instruction, and moves electronic device 210 in the pre-defined manner. In some embodiments, electronic device 210 compares the captured images and the determined positions with the pre-existing images at the different points of view (i.e., the pre-existing images at the different points of view may be stored locally on electronic device 210). Note that in some embodiments, during the comparing, electronic device 210 interpolates between the captured images and the determined positions or between the pre-existing images at the different points of view.

Alternatively, in some embodiments electronic device 210 provides the captured images and the determined positions to server 214 via network 212, and server 214 compares the captured images and the determined positions with the pre-existing images at the different points of view (i.e., the pre-existing images at the different points of view may be stored remotely from electronic device 210). The use of a central repository of pre-existing images (and the associated pre-determined features) for multiple users of multiple electronic devices may allow server 214 to determine which features are the most salient and stable to positively identify a given user from all others. Note that in some embodiments, during the comparing, server 214 interpolates between the captured images and the determined positions or between the pre-existing images at the different points of view.

If the match condition is achieved, electronic device 210 authenticates the user. Alternatively, server 214 may authenticate the user, and this authentication information may be communicated to electronic device 210 via network 212.

Note that information in system 200 may be stored at one or more locations in system 200 (i.e., locally or remotely). Moreover, because this data may be sensitive in nature, it may be encrypted. For example, stored data and/or data communicated via network 212 may be encrypted.

Figure 3:
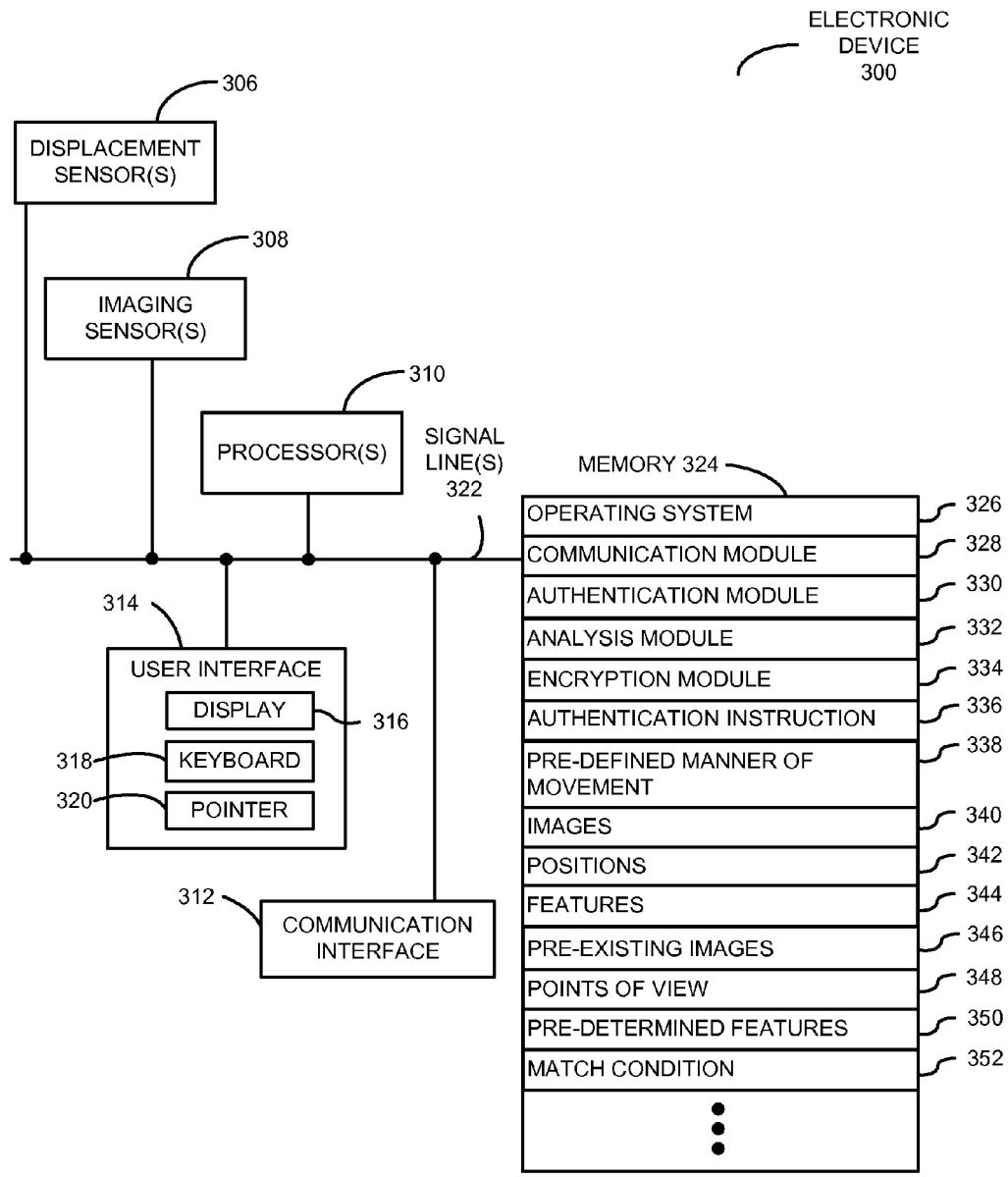
FIG. 3 is a block diagram illustrating an electronic device that performs the method of FIG. 1 in accordance with an embodiment of the present disclosure.

FIG. 3 presents a block diagram illustrating an electronic device 300 that performs method 100 (FIG. 1), such as electronic device 210 (FIG. 2). This electronic device includes one or more processing units or processors 310, a communication interface 312, a user interface 314, and one or more signal lines 322 coupling these components together. Note that the one or more processors 310 may support parallel processing and/or multi-threaded operation, the communication interface 312 may have a persistent communication connection, and the one or more signal lines 322 may constitute a communication bus. Moreover, the user interface 314 may include: a display 316, a keyboard 318, and/or a pointer 320, such as a mouse.

Memory 324 in electronic device 300 may include volatile memory and/or non-volatile memory. More specifically, memory 324 may include: ROM, RAM, EPROM, EEPROM, flash memory, one or more smart cards, one or more magnetic disc storage devices, and/or one or more optical storage devices. Memory 324 may store an operating system 326 that includes procedures (or a set of instructions) for handling various basic system services for performing hardware-dependent tasks. Memory 324 may also store procedures (or a set of instructions) in a communication module 328. These communication procedures may be used for communicating with one or more computers and/or servers, including computers and/or servers that are remotely located with respect to electronic device 300.

Memory 324 may also include multiple program modules (or sets of instructions), including: authentication module 330 (or a set of instructions), analysis module 332 (or a set of instructions) and/or encryption module 334 (or a set of instructions). Note that one or more of these program modules (or sets of instructions) may constitute a computer-program mechanism.

During method 100 (FIG. 1), authentication module 330 provides authentication instruction 336 to a user of electronic device 300, for example, using display 316. In response, the user moves electronic device 300 in a pre-defined manner of movement 338. While the user moves electronic device 300, imaging sensor(s) 308 capture images 340 and displacement sensor(s) 306 determine positions 342.

Subsequently, analysis module 332 compares the captured images 340 and the determined positions 342 with pre-existing images 346 at different points of view 348. For example, analysis module 332 may extract features 344 from images 340, and may compare features 344 with pre-determined features 350 associated with pre-existing images 346 using a feature classifier. Additionally, analysis module 332 may optionally confirm that motion vectors from images 340 match those associated with determined positions 342.

If a match condition 352 is achieved, authentication module 330 authenticates the user. For example, match condition 352 may include matching 70, 80 or 90% of features 344 with pre-determined features 350. Alternatively, match condition 352 may include a difference between faceprints associated with images 340 and pre-existing images 346 that is less than a threshold value, such as 10%.

Because information used in the authentication technique may be sensitive in nature, in some embodiments at least some of the data stored in memory 324 and/or at least some of the data communicated using communication module 328 is encrypted or decrypted using encryption module 334.

Instructions in the various modules in memory 324 may be implemented in: a high-level procedural language, an object-oriented programming language, and/or in an assembly or machine language. Note that the programming language may be compiled or interpreted, e.g., configurable or configured, to be executed by the one or more processors 310. Moreover, the modules in memory 324 may be standalone applications or a portion(s) of another application that is resident on and which executes on electronic device 300. Alternatively or additionally, one or more of the modules may be included in an application tool that is embedded in a web page provided remotely to electronic device 300, and which executes in a virtual environment of a web browser (not shown) on electronic device 300. Thus, the application tool may be provided to electronic device 300 via a client-server architecture.

Although electronic device 300 is illustrated as having a number of discrete items, FIG. 3 is intended to be a functional description of the various features that may be present in electronic device 300 rather than a structural schematic of the embodiments described herein. In some embodiments, some or all of the functionality of electronic device 300 may be implemented in one or more application-specific integrated circuits (ASICs) and/or one or more digital signal processors (DSPs).

Electronic device 300, as well as computers and servers in system 200 (FIG. 2), may include one of a variety of devices capable of manipulating computer-readable data or communicating such data between two or more computing systems over a network, including: a personal computer, a laptop computer, a tablet computer, a mainframe computer, a portable electronic device (such as a cellular telephone or PDA), a server, a point-of-sale terminal and/or a client computer (in a client-server architecture). Moreover, network 212 (FIG. 2) may include: the Internet, World Wide Web (WWW), an intranet, a cellular-telephone network, LAN, WAN, MAN, or a combination of networks, or other technology enabling communication between computing systems.

System 200 (FIG. 2) and/or electronic device 300 may include fewer components or additional components. Moreover, two or more components may be combined into a single component, and/or a position of one or more components may be changed. In some embodiments, the functionality of system 200 (FIG. 2) and/or electronic device 300 may be implemented more in hardware and less in software, or less in hardware and more in software, as is known in the art.

While the preceding embodiments illustrated the authentication technique by having the user move the electronic device in the pre-defined manner, in other embodiments the electronic device remains stationary. Instead the user moves relative to the electronic device in the pre-defined manner. In these embodiments, the positions of the user may be determined from the captured images.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic-device-implemented method for authenticating a user, the method comprising:
providing an authentication instruction to move the electronic device in a pre-defined manner;
using an imaging sensor in the electronic device, capturing multiple images of the user while the user moves the electronic device in the pre-defined manner;
using a displacement sensor in the electronic device, determining positions of the electronic device when the multiple images were captured;
comparing the images at the positions with corresponding pre-existing images of the user captured at different points of view; and
if the comparisons achieve a match condition, authenticating the user.

2. The method of claim 1, wherein the pre-defined manner includes a path at least partially around a head of the user.

3. The method of claim 1, wherein the displacement sensor is one of: an accelerometer, a gyroscope, and a second imaging sensor on an opposite side of the electronic device from the imaging sensor.

4. The method of claim 1, wherein the points of view are associated with different angles and distances from the user.

5. The method of claim 1, wherein the authentication instruction includes asking the user to speak during the authentication;
wherein the method further comprises:
capturing a voice of the user using an audio sensor in the electronic device; and
comparing the sound of the voice of the user with a pre-existing audio file of the voice of the user; and
wherein the authentication is further based on achieving a second match condition between the sound of the voice of the user and the pre-existing audio file.

6. The method of claim 1, wherein the authentication is further based on a challenge-response test.

7. The method of claim 1, wherein comparing the images involves extracting features from the images; and
wherein the match condition is based on the extracted features and features in the pre-existing images.

8. The method of claim 1, wherein, after authenticating the user, the method further comprises unlocking the electronic device.

9. A computer-program product for use in conjunction with an electronic device, the computer-program product comprising a non-transitory computer-readable storage medium and a computer-program mechanism embedded therein to authenticate a user, the computer-program mechanism including:
instructions for providing an authentication instruction to move the electronic device in a pre-defined manner;
instructions for capturing multiple images of the user using an imaging sensor in the electronic device while the user moves the electronic device in the pre-defined manner;
instructions for determining positions of the electronic device using a displacement sensor in the electronic device when the multiple images were captured;
instructions for comparing the images at the positions with corresponding pre-existing images of the user captured at different points of view; and
if the comparisons achieve a match condition, instructions for authenticating the user.

10. The computer-program product of claim 9, wherein the pre-defined manner includes a path at least partially around a head of the user.

11. The computer-program product of claim 9, wherein the displacement sensor is one of: an accelerometer, a gyroscope, and a second imaging sensor on an opposite side of the electronic device from the imaging sensor.

12. The computer-program product of claim 9, wherein the points of view are associated with different angles and distances from the user.

13. The computer-program product of claim 9, wherein the authentication instruction includes asking the user to speak during the authentication;
wherein the computer-program mechanism further comprises:
instructions for capturing a voice of the user using an audio sensor in the electronic device; and
instructions for comparing the sound of the voice of the user with a pre-existing audio file of the voice of the user; and
wherein the authentication is further based on achieving a second match condition between the sound of the voice of the user and the pre-existing audio file.

14. The computer-program product of claim 9, wherein the authentication is further based on a challenge-response test.

15. The computer-program product of claim 9, wherein comparing the images involves extracting features from the images; and
wherein the match condition is based on the extracted features and features in the pre-existing images.

16. The computer-program product of claim 9, wherein, after authenticating the user, the computer-program mechanism further comprises instructions for unlocking the electronic device.

17. An electronic device, comprising:
a processor;
memory; and
a program module, wherein the program module is stored in the memory and configurable to be executed by the processor to authenticate a user, the program module including:
instructions for providing an authentication instruction to move the electronic device in a pre-defined manner;
instructions for capturing multiple images of the user using an imaging sensor in the electronic device while the user moves the electronic device in the pre-defined manner;
instructions for determining positions of the electronic device using a displacement sensor in the electronic device when the multiple images were captured;
instructions for comparing the images at the positions with corresponding pre-existing images of the user captured at different points of view; and
if the comparisons achieve a match condition, instructions for authenticating the user.

18. The electronic device of claim 17, wherein the pre-defined manner includes a path at least partially around a head of the user.

19. The electronic device of claim 17, wherein the points of view include different angles and distances from the user.

20. The electronic device of claim 17, wherein comparing the images involves extracting features from the images; and
wherein the match condition is based on the extracted features and features in the pre-existing images.

* * * * *